(12) United States Patent
Shapiro (10) Patent No.: US 7,226,072 B2
(45) Date of Patent: Jun. 5, 2007

(54) COMPACT WHEELBARROW AND CART ASSEMBLY, SHIPPING AND DISPLAY METHODS INCLUDING HITCH AND TRAILING CONVERSIONS

(76) Inventor: Richard N. Shapiro, 1668 Dey Cove, Va Beach, VA (US) 23454

( * ) Notice: Subject to any disclaimer, the term of this patent is extended or adjusted under 35 U.S.C. 154(b) by 294 days.

(21) Appl. No.: 10/891,030

(22) Filed: Jul. 15, 2004

(65) Prior Publication Data

US 2004/0256838 A1 Dec. 23, 2004

Related U.S. Application Data

(63) Continuation-in-part of application No. 10/622,172, filed on Jul. 18, 2003, now abandoned, which is a continuation-in-part of application No. 10/157,980, filed on May 31, 2002, now Pat. No. 6,893,030, which is a continuation-in-part of application No. 09/604,769, filed on Jun. 28, 2000, now Pat. No. 6,581,495, application No. 10/891,030, which is a continuation-in-part of application No. 10/346,112, filed on Jan. 17, 2003, now Pat. No. 6,863,297, and a continuation-in-part of application No. 10/143,831, filed on May 14, 2002, now abandoned, which is a continuation-in-part of application No. 09/604,789, filed on Jun. 28, 2000, now Pat. No. 6,389,914.

(51) Int. Cl.
*B62B 1/00* (2006.01)

(52) U.S. Cl. .................................... 280/653; 280/47.33

(58) Field of Classification Search ................. 280/30, 280/653, 652, 47.31, 47.3, 654, 639, 645, 280/47.27, 47.26, 47.32, 47.33, 47.18, 47.19, 280/47.315, 763.1, 765.1

See application file for complete search history.

(56) References Cited

U.S. PATENT DOCUMENTS

| 1,242,418 | A | * | 10/1917 | Booth | 280/653 |
| 1,823,816 | A | * | 9/1931 | Chittenden | 280/653 |
| 2,468,390 | A | * | 4/1949 | Binz | 280/653 |
| 2,938,734 | A | * | 5/1960 | Guimond | 280/30 |
| 3,722,904 | A | * | 3/1973 | Puckett | 280/653 |
| 4,174,849 | A | * | 11/1979 | Wetzel | 280/47.3 |
| 4,471,996 | A | * | 9/1984 | Primeau | 298/3 |
| 4,740,008 | A | * | 4/1988 | Johnson | 280/475 |

(Continued)

*Primary Examiner*—Paul N. Dickson
*Assistant Examiner*—Bridget Avery (57) ABSTRACT

The application provides unique assembly, shipping, display, nesting and compact stowing methods for compact or convertible "sub-assemblies" for wheelbarrow and cart devices. The wheelbarrow or carrier device "sub-assembly" comprising all or some of the interconnected component parts of the device (except for the tub or base) may be selectively movable and stowable to the inside or underside of the cargo carrier, with the user only being required to move and rapidly secure the sub-assembly frame to the device. The wheelbarrow or cart "sub-assembly" disclosed may be entirely or substantially stowed within the side elevational profile and interior of the carrier device carrier space during shipping, transport or sales display, and/or selectively attached to the underside of the base or tub for shipping or display prior to actual use, by a series of any suitable quick release methods commonly known in the art. Other novel component parts of the said sub-assembly units for wheelbarrow or cart devices are also disclosed, including convertible methods allowing the carrier device to be either hitch mounted or trailer connected to a separate wheeled device, allowing the carrier to be mounted in either a setup or a stowed condition.

22 Claims, 7 Drawing Sheets

U.S. PATENT DOCUMENTS 5,372,376 A * 12/1994 Pharaoh .................. 280/653
6,886,838 B1 * 5/2005 Zimmerman ............. 280/47.31
6,923,469 B2 * 8/2005 Tomchak et al. ........... 280/653
6,935,643 B1 * 8/2005 Purpuro .................. 280/47.32

* cited by examiner

COMPACT WHEELBARROW AND CART ASSEMBLY, SHIPPING AND DISPLAY METHODS INCLUDING HITCH AND TRAILING CONVERSIONS

RELATIONSHIP TO ALL OTHER APPLICATIONS

This application is a continuation-in-part of U.S. patent application Ser. No. 10/622,172, filed on Jul. 18, 2003 now abandoned (Compact Wheelbarrows and Carts), U.S. patent application Ser. No. 10/157,980 filed on May 31, 2002 now U.S. Pat. No. 6,893,030 (compact wagons), which is a continuation-in-part of Ser. No. 09/604,769 filed on Jun. 28, 2000 now U.S. Pat. No. 6,581,945. Additionally, this application is a continuation-in-part of Ser. No. 10/346,112 filed on Jan. 17, 2003 now U.S. Pat. No. 6,863,297, a continuation-in-part of Ser. No. 10/143,831 filed on May 14, 2002, which is a continuation-in-part of Ser. No. 09/604,789 filed on Jun. 28, 2000 now U.S. Pat. No. 6,389,914.

Shapiro's previous U.S. applications include, Ser. No. 09/271,274, filed on Mar. 17, 1999, now U.S. Pat. No. 6,220,611, granted Apr. 24, 2001.

FIELD OF THE INVENTION

The present invention relates to novel assembly, shipping, display and stowing methods relating to compact wheelbarrows, wheeled carts, and cargo carriers, including one or more wheels, which may also include combinations of stowable support stands and stowable handles. The carrier devices are also convertible to and from either hitch or trailer mounts to separate rolling devices. Various embodiments focus on wheelbarrows, and one or more wheeled carts; however, a wide variety of cargo, personal or child, and equipment-carrying carriers may be adapted with the "sub-assemblies" and folding wheel structures described. This application also provides unique sub-assemblies which are movable from a non-use stowed position located within the interior carrier space of the device, to a rapid attachment to the device underside where the sub-assembly may remain secured in either a stowed or operative position. The invention discloses extremely efficient shipping, display and compact storage methods for such carrier devices, as well as alternative methods to either mount such devices to separate rolling device hitch mounts or trailer hitches where the carrier device is in a rolling or non-rolling status.

BACKGROUND OF THE INVENTION

Applicant's continuation-in-part U.S. Ser. No. 10/622,172 disclosed novel methods relating to compact wheelbarrows and carts. Ser. No. 10/622,172 evolved from applicant's prior applications, including continuation-in-part U.S. Ser. No. 10/346,112, filed on Jan. 17, 2003, wherein disclosures were made relating to compact, folding walking or jogging strollers and similar cargo carriers and disclosed new and unique pivoting and stowable wheel mechanisms for a typically forward wheel on jogging or walking strollers, but also broadly adaptable to other carts and cargo carriers, with different wheel configurations. In another U.S. patent application Ser. No. 10/157,980, the applicant disclosed compact wagon and cart carrier devices with pivoting and stowable wheels, underside supports, and handles. This particular application also integrates several innovations of the applicant described in the jogging stroller/cargo carrier application referenced above, with various disclosures adapted from the compact wagon/cart application Ser. No. 10/157,980, along with new innovations. A number of these innovations are therefore integrated for wheelbarrows or similar wheeled carts disclosed herein.

This continuation in part application discloses details of assembly, shipping and stowing of the component parts of wheelbarrows and carts focusing on efficiency of shipping, display and storage of these bulky and unwieldy carrier devices, in a manner not disclosed by any prior art. Some prior inventions have disclosed methods of collapsing some parts of a sub-assembly of a carrier device, such as Tomchak, et al, in both Ser. No. 216,071 (filed Sep. 9, 2002) and Ser. No. 431,078 (filed on May 7, 2003). However, the prior art relating to carrier device subassembly units fails to provide methods for folding or collapsing each and every component part of such carrier devices (including its wheel or wheels) in a compact, selectively movable sub-assembly which itself may be stowed either inside the side elevational profile and perimeter of the carrier space base or moved to the carrier base underside, to establish both a stowed or a fully operative position, nor does the prior art provide for rapid and selective securement of the main sub-assembly in either said position. Also, no prior similar cart provides that the sub-assembly may itself secure each and every component without the user being required to affix or secure various component parts to the sub-assembly. As for the cargo carriers with selectively removable interconnection hitch element disclosures also made in this application, Martin, in Ser. No. 10/279,199, filed on Oct. 23, 2002, contemplates mounting a multiple use cargo carrier via a hitch mount to a vehicle. Martin described that the cargo carrier may include "removable wheels" and "removable handles" (see paragraph 0051), but Martin fails to contemplate a movably stowable wheel and handle, both having an operative and stowable non-detached position, thus avoiding inconvenient removal and reconstruction (the same is true for the underside supports). The applicant's disclosures also importantly provide not only for non-detaching stowable parts, but that the stowed position of the wheel, handle and underside supports preferably does not occupy any of the usable interior carrier space when the device is used to hold cargo while attached by hitch to a vehicle.

SUMMARY OF THE INVENTION

This application provides unique general compact stowing methods for sub-assemblies frame structures on wheelbarrow or cart devices, along with selectively removable hitch or trailer mounting methods. The "sub-assembly" frames may comprise all or less than all component parts of the device (except for the tub or base), which sub-assembly may be selectively movable and stowable with the user only being required to manipulate and secure the sub-assembly frame to either the inside or underside of the device base. The wheelbarrow or cart "sub-assembly" structures disclosed may be entirely or substantially stowed within the side elevational profile and perimeter of the carrier device "tub" or "base" during shipping, transport or sales display, and selectively attached to the underside of the base or tub prior to operative use by a series of any suitable "rapid release"/securement elements commonly known in the art. The "sub-assembly," once secured to the underside of the tub or base, includes all typical components for the carrier device that may be moved between a stowed and operative position in an ultra compact stowed profile. The methods disclosed allow for rapid or quick attachment and release of the "sub-assembly" frame as a single unit to the interior of the tub or base or to the device underside by a series of any suitable securing methods, which may involve one and the same quick release methods for either of said positions. The advantages of providing for a sub-assembly which ships and stows inside the carrier device profile are numerous and improve not only the size of the shipment box itself for such devices, but since wheelbarrows and similar carts are bulky and unwieldy, under the present art, inconvenient time and effort is mandated for sales retailers to re-construct or even set up display space for such devices. End users have difficulty storing such devices in a convenient manner, and the disclosures here solve many of the inconveniences above mentioned.

This application also provides integration of a number of innovations of the applicant from separate earlier applications but particularly applied now to single- or multi-wheeled wheelbarrows and carts including: methods to latch, release and/or move the forward wheel of a wheelbarrow or cart from an operative position into one or more alternative stowed positions, at least nearly within the side elevational profile of the bed of said device, methods to latch and release one or more varieties of underside supports for the cart device and to allow them to stow substantially within the side elevational profile of the cart, methods to provide for two separate wheelbarrow handles or a u-shaped wheelbarrow handle that has an operative position, and a second, stowed position flush with or within the side elevational profile of the cart device and unique methods to assemble, ship, display and nest or stack the operative and stowed devices in a convenient fashion. Additionally, this application provides novel methods which permit the carrier devices, with all component parts interconnected, to be removably mounted to separate wheeled devices by either hitch mounts or various trailer mounts, with the carrier device in either an operative or stowed status of the wheel or wheels and other components while interconnected in the hitched status.

Further features and advantages of the present invention will be set forth in, or apparent from, the detailed description of preferred embodiments thereof which follows.

BRIEF DESCRIPTION OF THE DRAWINGS

FIG. 3-B is a top plan view, with an elevated side perspective with the sub-assembly 2 having its subassembly mounting frame face down and is the preferred cover figure;

FIG. 5-A is an underside plan view of alternative carrier device two connected by hitch to a separate rolling device;

FIG. 5-B is an underside plain view of a second alternative device three connected by hitch to a separate rolling device;

FIG. 5-C is a side elevational view of a hybrid of carrier devices 2 & 3, slightly elevated, focusing on one handle extension and retraction method.

DESCRIPTION OF THE PREFERRED EMBODIMENTS

Description

1A. Carrier Device Unit
1. Tub
2. Wheelbarrow or cart Subassembly Unit
3. Forward Mounting Cross Member
4. Rear Mounting Cross Member
5. Handle
6. Handle Collar
7. Handle Latch
8. Wheel
9. Wheel Fork
9A. Wheel Fork Latch Receiving Cavity
10. Wheel Fork Tire Bolt
11. Wheel Fork Dumping Stand
12. Wheel Fork Secondary Support
12A. Wheel Fork Secondary Support Tub Brace
13. Wheel Fork Head Support Axis
14. Wheel Fork Head Rotation Collar
15. Wheel Fork Mounting Pin
16. Wheel Fork Stowed Position Latch or Magnet
17. Handle Collar Ramp
18. Wheel Fork Mount
18A. Wheel Fork Mounting Arm
18B. Wheel Fork Mounting Brace
19. Wheel Fork Brace Latching Pin
20. Wheel Fork Latching Pin Spring(s)
21. Underside Support(s)
22. Underside Support Mounting Brackets
23. Underside Support Latch
23A. Underside Support Latch Spring
24. Subassembly Unit retaining means
25. Mounting Bolts
26. Mounting Bolt Nuts
27. Quick Release Bolt
28. Quick Release Nut
29. Wall Hanging Recess
30. Cart Device 2
31. Vehicle Hitch Receptor
32. Selectively Removable Hitch Element
33. Carrier Hitch Receptor
34. Lock
35. Carrier Device 3

36. Vehicle

37. Alternative U-shaped Handle

38. Center Pull Handle

39. Cavity

40. Latch

Figure 1:
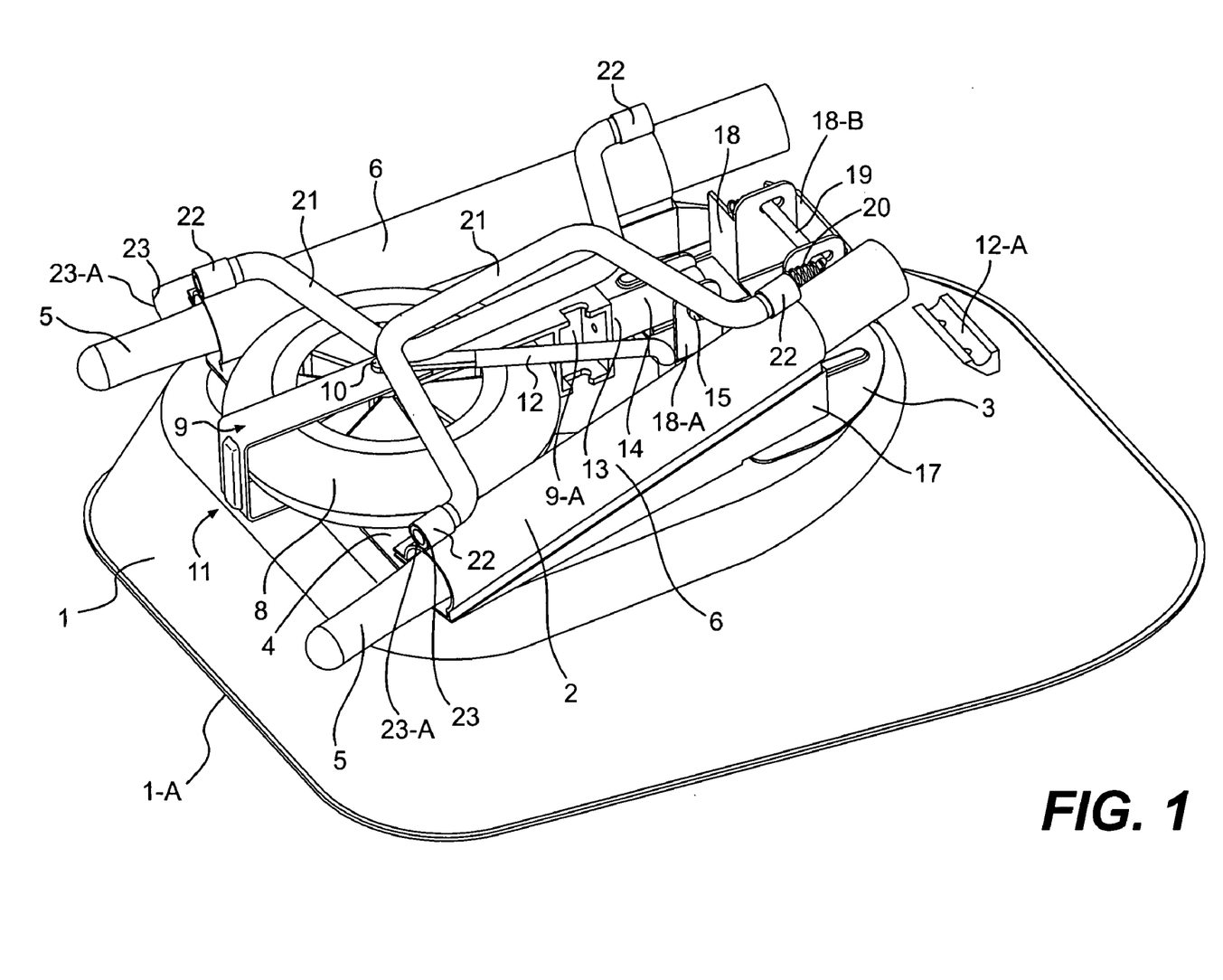
FIG. 1 is a side perspective view of the inverted wheelbarrow or cart 1-A in a fully stowed position.
Figure 2:
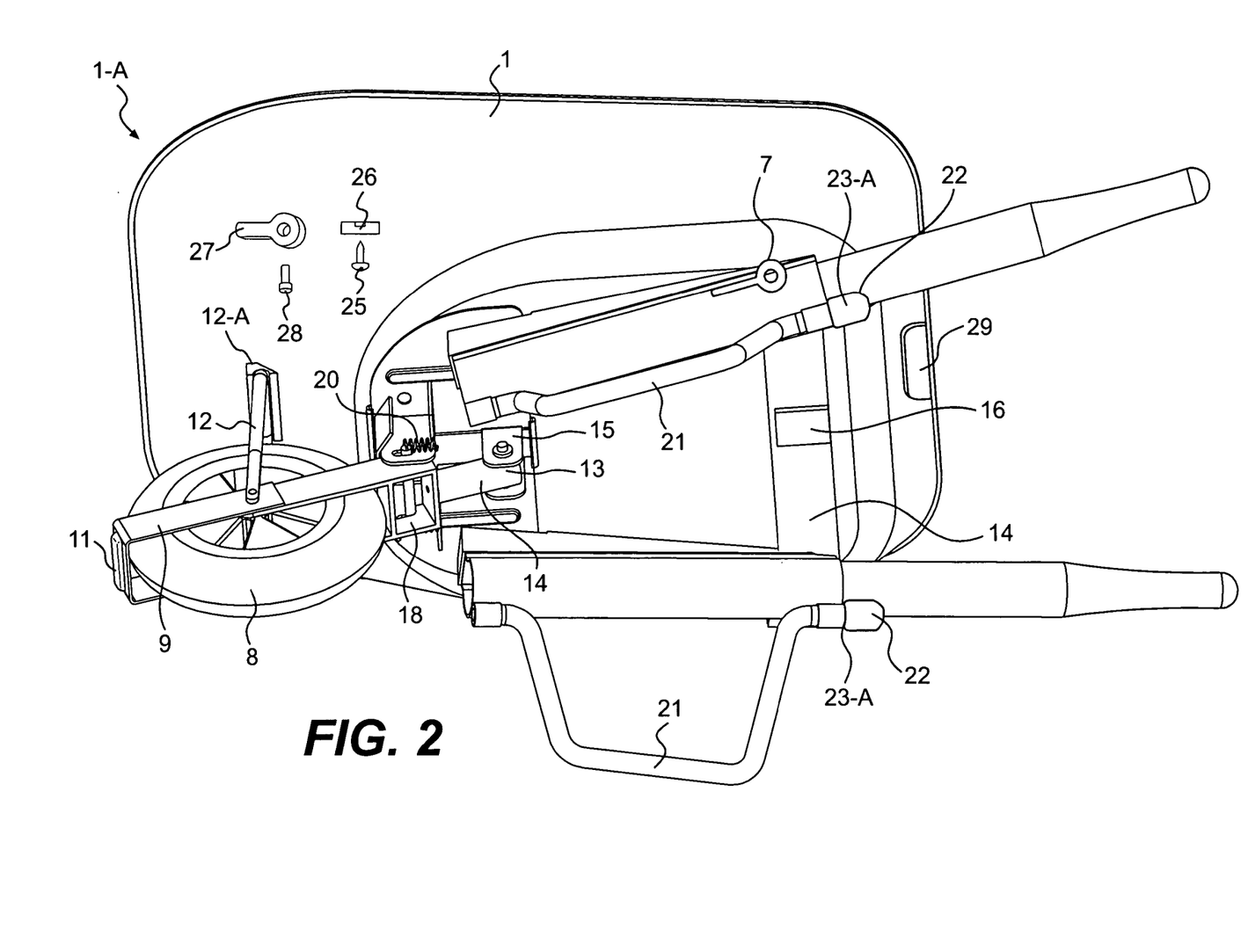
FIG. 2 is an underside perspective view of device 1-A in the fully operative position.
Figure 3:
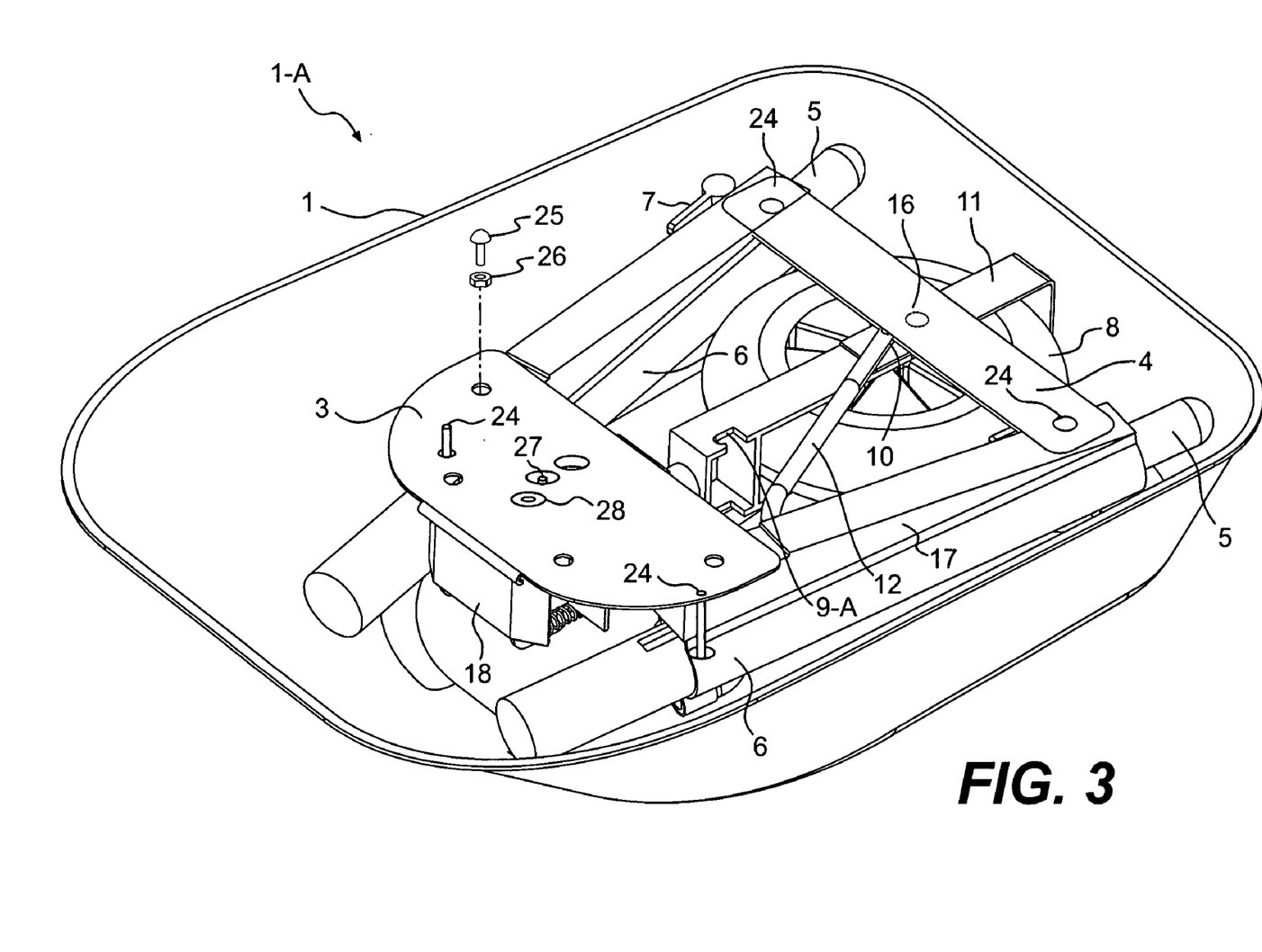
FIG. 3 is a top plan view, with an elevated side perspective of the of the cart device 1-A with a sub-assembly unit 2 in its interior space, with the subassembly mounting frame in an orientation as if a second device was nested theron.

The wheelbarrow or cart device denoted 1-A is described first in relation to FIGS. 1-3. FIG. 1 shows a view of the movable subassembly frame system 2 mounted to the underside of the carrier device tub or base (1). In FIG. 1, all component parts are in a stowed position. Referring to FIG. 2, all of the same component parts are shown in an operative, in use position. Referring to FIG. 3, all of the operative parts of the subassembly (2) are shown fitting into the interior of the tub or base (1) carrier space. In FIG. 3, the orientation of the subassembly (2) is shown as if a second stowed wheelbarrow or cart device 1-A is nested atop a second unit shown in the figure. (However, tub 1 of the upper unit is omitted from the view). The preferred wheelbarrow device shown in FIG. 1 has a subassembly unit (2), which includes a forward mounting cross member (3) and a rear-mounting cross member (4) (Shown best in FIGS. 2 and 3). All of the handle, wheel, and support stand components are shown mounted to one or the other of the said cross members 3 and 4. In FIG. 1 are shown two elongate handles, (5) recessed inside a pair of handle collars (6). Each handle may be extended and then latched by virtue of handle latches (7) (See FIGS. 2 and 3). Although a simple pivoting handle latch (7) is shown in FIGS. 2 and 3, any suitable handle latch may be used to allow for an operative and stowed latched handle position (not shown).

FIG. 1 also shows the stowed position of the wheel (8). The wheel (8) is mounted by virtue of a wheel fork tire bolt or pin (10) to a wheel fork (9). FIG. 2 shows the wheel (8) in its operative, in use position, where the wheel fork dumping stand (11) can be clearly seen. The wheel fork (9), may have optionally mounted to it a wheel fork secondary support (12), which is movable or pivotable along the wheel fork (9). In the operative position, the user manipulates the wheel fork's secondary support (12) into securement with a wheel fork secondary support tub brace (12A), to provide further support between the wheel fork (9) and the carrier base or tub (1). As is best seen in FIGS. 1 and 2, the wheel fork (9) is mounted to the underside aspect of the tub or base by a wheel fork-mounting unit (18). The wheel fork mount unit includes two separate parts, one being a wheel fork-mounting arm, (18A) to which the wheel fork (9) is mounted by virtue of the wheel fork mounting pin (15). However, the wheel fork mount (18) also includes another portion, which is the wheel fork mounting brace (18B) (Seen best in FIG. 1). Further mounted to the wheel fork mount (18) is a wheel fork brace latching pin (19) seen in FIG. 1. The pin (19) is spring-biased inside the wheel fork mounting brace (18B) by a pair of wheel fork latching pin springs (20) (one clearly showed in FIG. 2).

In the operative position of the wheel shown in FIG. 2, the wheel fork assembly includes a wheel fork head support axis (13) and may include a wheel fork head rotation collar (14) proximate to the wheel fork mounting position (not shown in this view). It is understood that one of the innovations of the applicant is the method by which the wheelbarrow or cart tire moves between the operative and stowed positions shown in FIGS. 1 and 2, which was more fully discussed and described in applicant's prior application Ser. No. 10/622, 172, filed on Jul. 18, 2003. Essentially, FIG. 2 shows the operative forward tire position where it is latched and received by a brace (the wheel fork mount 18). To move the tire to the stowed position in FIG. 1, the user would unlatch any suitable latching system (one is shown here), move the wheel fork away from the underside bracing portion of the device, rotate the tire approximately 90 degrees on its support axis, and then move and/or pivot the wheel back toward the center point of the perimeter of the wheelbarrow or cart device that is shown in the stowed position in FIG. 1. Any suitable latch may be utilized to latch the tire (8) in the stowed position shown. In one preferred embodiment shown in FIGS. 1-3, the wheel latching method is affected in the operative position (FIG. 2) by virtue of a set of cavities or receiving portions 9A, denoted as wheel fork latch receiving cavities, which are a part of the wheel fork (9). Other latching methods may be employed but are not shown. When the wheel fork (9) is placed into the operative position shown in FIG. 2, a pair of wheel fork latch receiving cavities (9A) are received by the wheel fork mounting brace (18B) allowing the wheel fork latching pin (19) to effectively latch the wheel fork (9) in the operative position shown in FIG. 2.

The user, to release the forward wheel shown in FIG. 2, would simply move the wheel fork brace latching pin (19) (which is spring-biased) in a direction away from the center point of the base to effectuate release of the operative tire position.

Any suitable latching means for the stowed tire position may be employed, but in the preferred embodiment shown in FIGS. 2 and 3, a magnet is mounted to the rear cross member (4) to latch the wheel (8) in the stowed position shown in FIGS. 1 and 3. Or, the tire may simply be latched between the tub underside and the stowed underside supports in their latched state. Referring to FIG. 1, this figure also shows that a pair of handle collar ramps (17) may be mounted to any suitable portion of the handle collar (6) which may in turn, be mounted to the forward mounting cross member (3) and/or also to the rear mounting cross member (4), to direct the forward tire at any suitable angle to the rolling surface.

Referring to both FIGS. 1 and 2 are also shown a pair of underside supports (21), which are supported to a portion of the subassembly (2) by virtue of four underside support mounting brackets (22). It is appreciated that instead of a pair of underside supports, a wheelbarrow or cart may instead employ a single underside support, which may have a stowed and operative position. In this preferred embodiment in FIGS. 1 and 2, proximate to the underside support mounting brackets (22), may be included a series of underside support latches (23) (not shown). Any suitable latch may be utilized, including a spring biased latch (23A) (not shown). Manipulation of the latch interacts with the underside supports (21) effecting latching and releasing of the support. Alternatively, the pair of underside supports (21) may also be interconnected by a transverse retaining support arm (not shown) mounted to one support, which joins with the opposing support, and is movable along with the supports (21) from an operative to a stowed position. In the operative position, this transverse support joins each of the underside supports 21 to provide further operative position support, and is also movably stowable flush with the carrier underside.

Referring to FIG. 3, a series of sub-assembly unit retaining means are provided (24) to retain both the forward cross member (3) and the rear cross member (4) to each respective handle collar (6) and to the handle collar ramps (17) (although it is presumed that the handle collar ramp and the handle collar may alternatively be integrated into a single component part rather than separate ones). Any suitable retaining means may be utilized, including screws, bolts, a welding method, or even resilient male/female connection between the cross members (3 and 4) and the handle collar (6) and handle collar ramp (17). However, the effect of the sub-assembly retaining means is to create a unitary sub-assembly unit (2) which may retain all of the component parts of the wheelbarrow or carrier device so that it also may be (when in a stowed position) placed entirely into the interior of the carrier space or secured to the underside aspect of the carrier device. For example, in shipment, the sub-assembly may be placed inside the carrier's space and either secured or never secured to the base.

FIG. 3-B shows the particular relationship of the sub-assembly unit (2) inside the carrier space of the tub (1). The relationship between the sub-assembly unit (2) and the tub (1) in FIG. 3-B may be oriented in any direction, besides that shown or may be inverted (as seen in FIG. 3).

Figure 4:
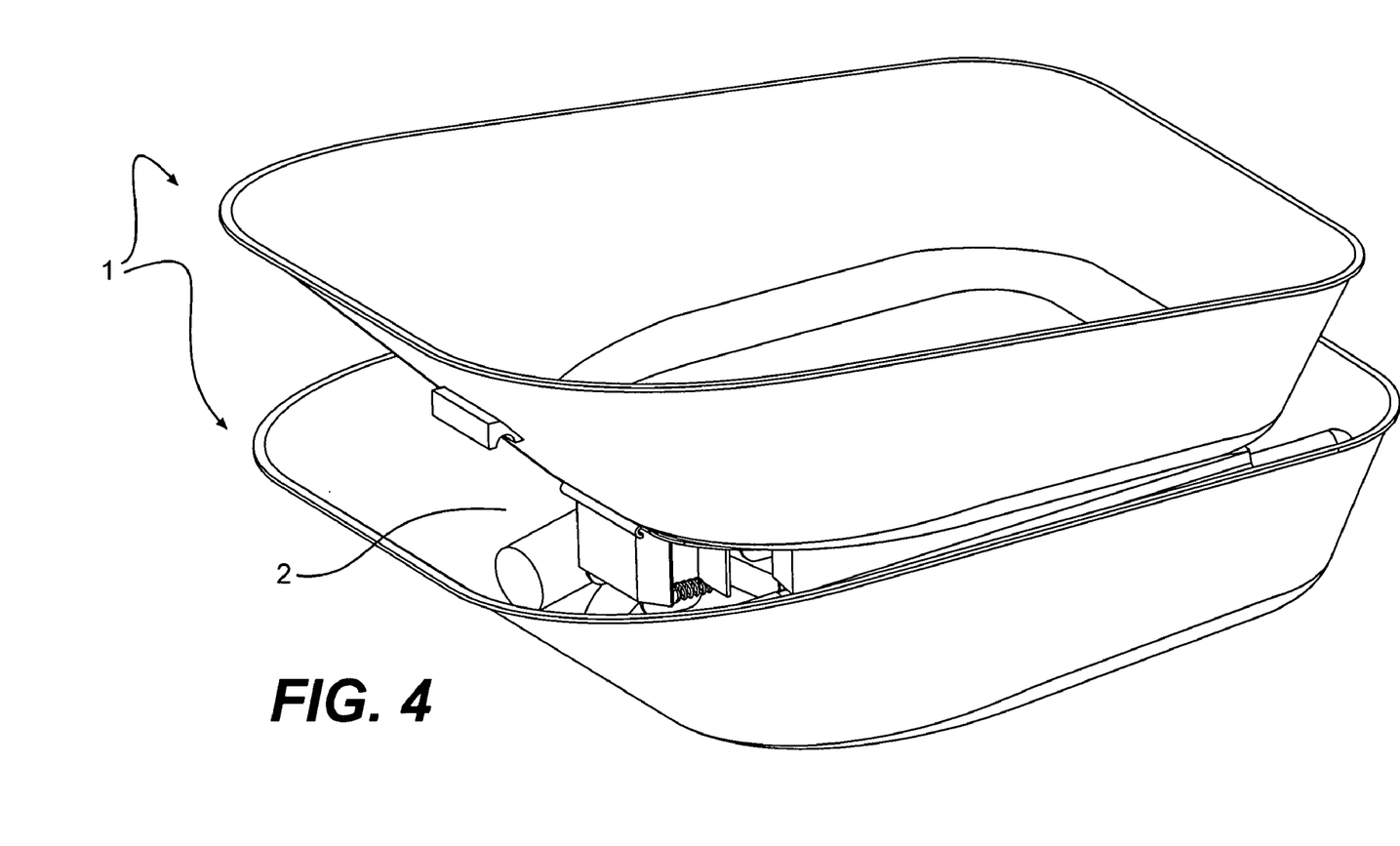
FIG. 4 is a forward end elevational view, slightly elevated, of two cart devices in nested relationship, showing the upper device, nested within the interior space of the lower device tub.

As shown in FIG. 4, two carrier devices are shown in a nested relationship. In FIG. 4, the upper of the two stowed units has a sub-assembly attached to the underside aspect of the tub (1). The uppermost carrier device, 1, and/or its sub-assembly unit 2 nests at least partly inside the side elevational profile of the lower tub 1. Of course, the orientation of the uppermost carrier device in FIG. 4 may be instead oriented 180 degrees in the opposite direction. Also, it is assumed that multiple units may be nested although only two are shown. Referring back to FIGS. 2 and 3, are shown examples of one type of the mounting bolts and mounting bolt nuts which may be used to retain the sub-assembly unit (2) to the wheelbarrow or carrier device (1-A). A series of such bolts and nuts may be used to secure the sub-assembly to the tub along the underside aspect, or the orientation of the sub-assembly unit may be such that the same bolts and nuts can be utilized to temporarily secure the sub-assembly unit (2) in the interior carrier space of the tub (1) when the sub-assembly unit is oriented as shown in 3-B. Alternatively, the device may be provided with quick-release thumb screws or bolts (27) and quick release nuts (28), which are oriented on the sub-assembly unit (2) and its cross members (3 and 4) in a manner that allows the user to manipulate a series of quick release thumb screws or bolts to release the unit with easy manual manipulation from either the interior space position or from the underside aspect position. The nuts or bolts may be semi-permanently retained on the sub-assembly unit (2) (not shown). Although not depicted in any figure, the shape of the tub 1 underside and interior space may be suitably shaped with slide brackets or a series of receptors that match corresponding shaped portions of the subassembly unit, so that the subassembly is movable onto and off of the shaped receptors when secured and released.

Referring back to FIG. 2, is shown a wall hanging cavity or recessed portion (29) along the handle end of the tub (1) stub wall, with the intention being that the unit, in a fully stowed position such as shown in FIG. 1, may be hung on a suitable wall hook-like structure (not shown). Also, the cavity or opening (29) may be located in any suitable position along the tub stub wall, such as the forward end wall (not shown).

Figure 5A:
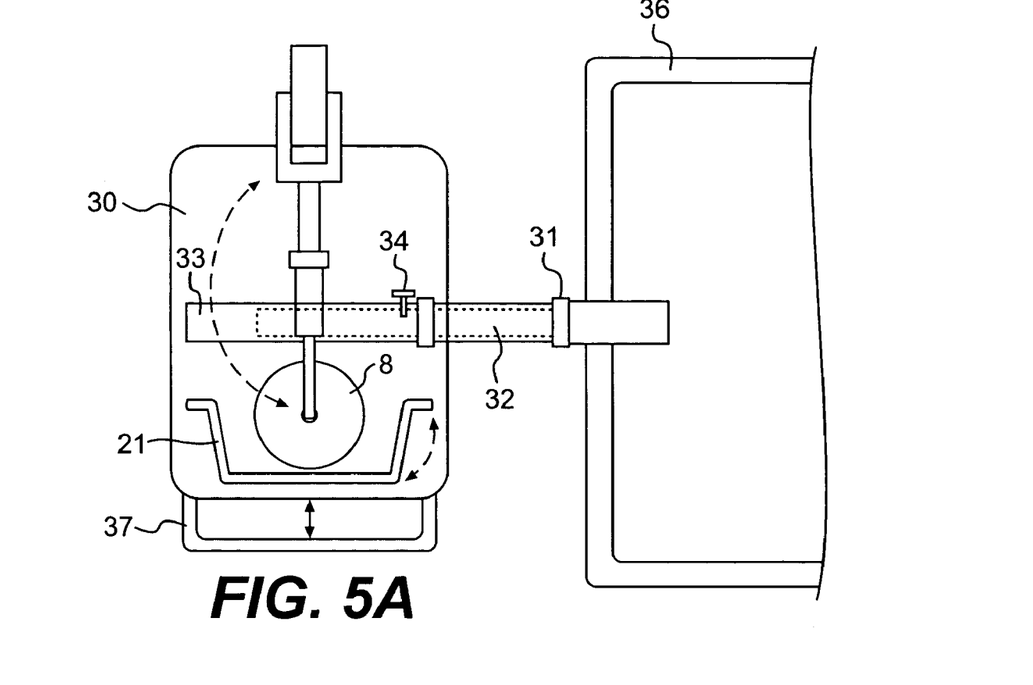
Figure 5B:
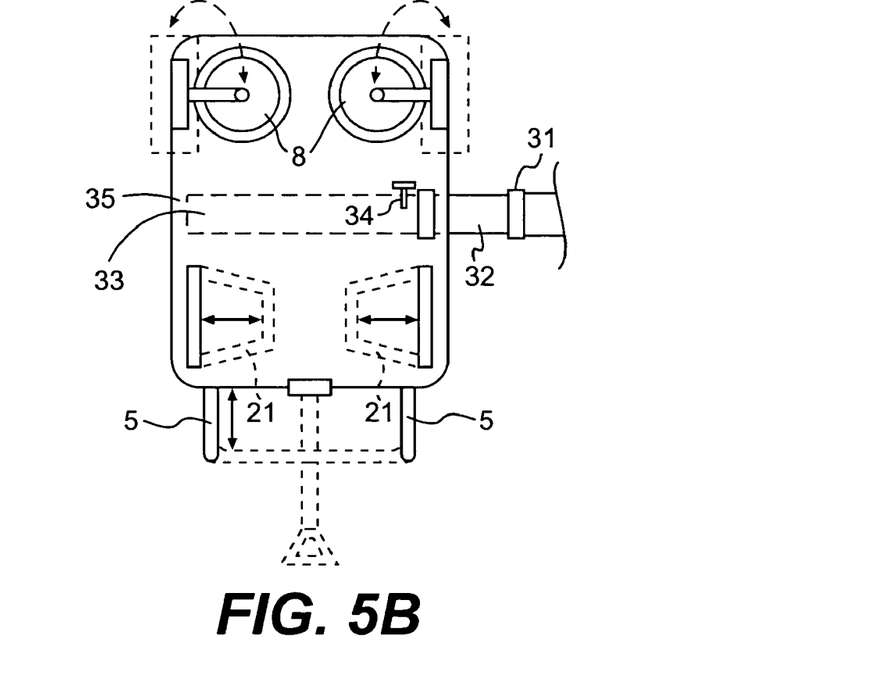
Figure 5C:
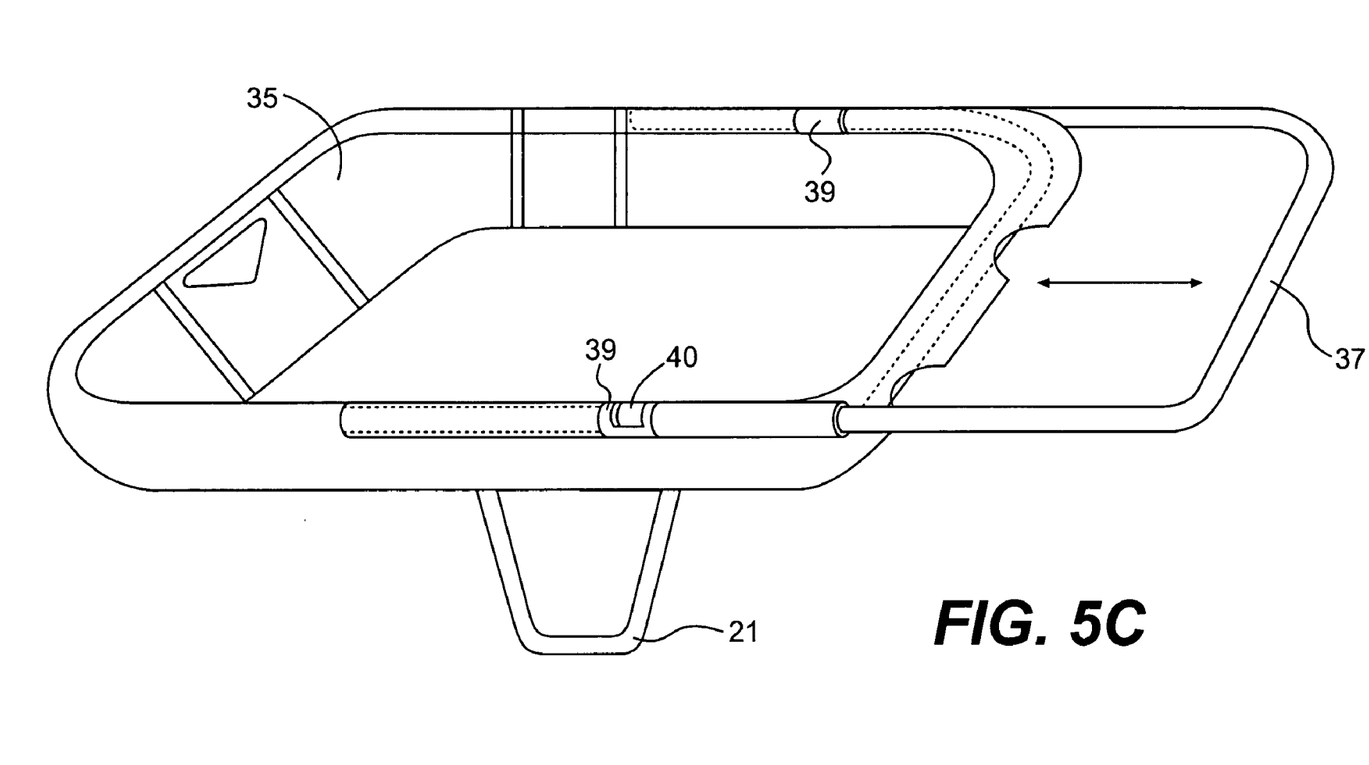

FIG. 5-A shows an underside view of an alternative carrier device 2 (30) mounted on a selectively removable hitch element (32) which mounts to a hitch (31) interconnected to a vehicle (36) (which also may instead be any type propelled rolling device). The hitch element (32) is selectively retained to the vehicle hitch (31), as well as to a hitch receptor (33), formed from a part of the carrier (30) base (detail omitted). At least one latch or lock (34) interacts with the hitch (32) and the carrier hitch receptor to prevent unintended detachment of the carrier (30) and the hitch (32). Further, another latch or lock may prevent the hitch (32) from removal from the vehicle hitch (31) receiver area (not shown). FIG. 5-A also includes the stowed tire (8), which also shows in ghost perspective the operative tire position. Also, one suitable type support stand (21) is shown stowed, and is movable to an operative position (not shown). One suitable handle design (37) is shown in an operative position, yet in the stowed handle position the handle moves into suitable openings or cavities formed from the stub wall portions of the carrier device (see detail in 5-C). The carrier device is mounted transversely (although any other mount is possible) and may be propelled by the vehicle in a full stowed (or operative) status, and is still capable of holding a full load of cargo in the interior of the carrier bed. The device may or may not include a selectively removable sub-assembly frame structure (for the wheel and other components).

FIG. 5-B shows alternative carrier device 3, (35), which may be mounted to a separate rolling device by virtue of selective removable hitch element (32), connected at vehicle hitch (31). The hitch element (32) may be transversely mounted as shown, or in any other alternative fashion (not shown). Again, any suitable latch (34) may be included to secure the hitch element to the convertible carrier device (35). FIG. 5-B, carrier device (3) includes two stowable wheels, (8). FIG. 5-B these wheels have a stowed position generally along the underside of the carrier device (35). However, the tires also have an operative position where they may be moved orthogonally to the carrier base when the carrier device is disconnected from the hitch element (31) for rolling use. The carrier device (35) also may have one or more alternative types of underside supports. FIG. 5-B shows a pair of matching underside supports (21) in a stowed position in ghost perspective. The underside supports have an operative position where they are positioned orthogonally to the carrier base as generally indicated in the figure. Of course, any suitable underside supports may be utilized when the carrier device is in an operative position, including a single underside support as shown in FIG. 5-A or any other suitable method. Also, 5-B indicates that a pair of generally matching elongate handle elements (5) may be employed. In an extended position, the elongate handle elements are grasped by user in order to push or pull the carrier device when it is in operative condition (or a one piece "U" shaped handle may instead be employed with the elongate portions extending along the carrier device side walls), yet each of the matching elongate handle elements are retractable and stowed generally within the side elevational profile and at least close to the perimeter of the carrier device (35) (not shown here). Also shown in ghost perspective in FIG. 5-B is alternative center pull handle (38) which may be used alternatively rather than the handles (5) shown in FIG. 5-B. The center pull handle is less preferred, but may be moved and stowed closely contiguous to the carrier base in any suitable fashion.

Further, FIG. 5-C shows alternative carrier device (35) (a hybrid of carriers 2 & 3) focusing on the handle method. The generally U-shaped handle shown (37) (but instead two elongate handles may also be used as shown in other figures) has a latched extended position in FIG. 5-C. The extended operative handle position is maintained by virtue of movable latches (40), one preferred on either side of the device but only one side is shown in FIG. 5-C. On each side of the carrier device (35), there is a suitably shaped cavity (39). The cavity (39) is formed from a portion of the stub wall profile of the device and gives access to the handle (37)

through the cavity (39). Movably mounted adjacent to the open cavity is a movable latch (40) which interacts with a portion of the handle (37) to cause latching of the handle in the extended position as shown in FIG. 5-C. In use, the user moves movable latch (40) into engagement with a portion of the handle (37) causing the handle to be latched in the extended position. A variety of methods may be used to interact the latch with the handle, including but not limited to a male/female retention, a retractable détente method, or alternatively a handle "locking ring" may be employed as disclosed in applicant's previous application Ser. No. 10/157,980 filed on May 31, 2002, which disclosed a movable locking ring which surrounds the handle shape interacts as the latch to engage the handle (37). Reverse movement of the latch (40) allows the handle to be retracted to a stowed position shown in a ghost perspective in 5-C, where the handle may be stowed flush with the cart stub wall profile and/or under a stub wall lip or protruding section. FIG. 5-C also shows one of a potential series of underside supports (21). The underside support shown is in the operative position and may be stowed flush with the profile of the carrier device.

In either FIG. 5-A or 5-B it is understood that either of the carrier devices shown are removable from the hitch of the separate vehicle, shown in 31. The user may then move the series of stowable components into an operative condition which allows the carrier device to be loaded with cargo or persons or a combination, and the carrier device may be generally utilized as a rolling carrier device. Also, the carrier device may be placed in a stowed position allowing the carrier device to be stored away from the vehicle in a compact, stowed profile, and not returned unto the vehicle until the user so desires to reconnect it to the vehicle by the hitch. The removable hitch may be retained to the vehicle, or to the carrier device.

Although the invention is described with specific embodiments, it is appreciated that any combination of structures described, or location of stowable or non-stowable wheels, supports or handles may be employed without departing from the spirit of the disclosures herein, and that various carrier shapes, bases, and wall configurations may also be adapted. Single or multiple wheel configurations may be employed and handle and underside support embodiments disclosed in one figure may be mixed and matched with other wheel configurations.

What is claimed is:

1. A wheeled carrier device, said device comprising:
    a support base bottom defining a plane substantially perpendicular to a rolling surface including a plurality of upwardly projecting stub walls, defining a periphery, a side elevational profile and a perimeter, as well as an interior space and an underside aspect, and
    at least one hand grasp serving as a handle; and
    a selectively removable sub-assembly mounting frame defining a periphery includes at least one movably mounted wheel support unit component defined by at least one wheel and wheel attaching means and at least one movably mounted underside support component, and
    a transport and storage position of the selectively removable sub-assembly mounting frame wherein the frame and the movably mounted components are located within the periphery, side elevational profile, perimeter as well as the interior space of the carrier device support base above the support base bottom, and
    in an underside aspect mounted position the selectively removable sub-assembly mounting frame is removably mounted to the underside aspect of the support base structure by at least one manually releasable connection, and the selectively removable sub-assembly mounting frame has at least two selective positions in said underside aspect mounted position,
    in a first operative underside aspect mounted position the at least one wheel support unit is erected providing rolling support for the carrier device and is orthogonal to the support base, and the at least one underside support is erected orthogonally to the support base, providing support between the device and the rolling surface, and
    in a second, stowed underside aspect mounted position, at least one wheel support unit and at least one wheel is substantially parallel with and contiguous to the underside aspect of the support base, and the periphery of the selectively removable sub-assembly mounting frame and the movably mounted components are substantially within the periphery, side elevational profile and perimeter of the carrier device support base.

2. A device in accordance with claim 1 wherein the at least one movable underside support retains the wheel support unit in at least the second, stowed position.

3. A device in accordance with claim 1 wherein latching means for the at least one wheel support unit include at least one spring biased latch which interacts with a portion of the wheel attaching means of the wheel support unit to provide latching of the wheel support unit in at least the first, operative position.

4. A device in accordance with claim 1 wherein the at least one handle includes an extensible portion and a receiving portion, and provides a handle latching means and selective manual manipulation to secure the extensible handle portion in relation to the receiving portion in both an extended and retracted position in relation to the support base perimeter.

5. A device in accordance with claim 1 wherein a shaped portion at least near to the free upper edge of at least one stub wall serves as a hook receiving area to permit the carrier device to be hung on a protrusion mounted on a vertical surface.

6. A wheeled carrier device in accordance with claim 1 including a selectively removable interconnection hitch element which in a first, operative position serves as a hitch, interconnecting the carrier device and a separate rolling device, so that the separate rolling device propels the interconnected carrier device.

7. A carrier device in accordance with claim 1, wherein the at least one movably mounted wheel support unit includes a latch and at least one arm structure which is further mounted to a pivot joint; and
    the joint is further mounted to the sub-assembly mounting frame; and
    the joint and the latch in said first, operative position, retain the wheel of the wheel support unit in said first operative, position, substantially orthogonal to the carrier device support base; and
    in an intermediate position, the wheel support unit and the arm structure is released from the latch and both movable on the joint along a substantially vertical plane, and rotatable along an axis of rotation of the joint at least 90 degrees; and
    in the second, stowed position, the wheel is directed inward toward the center of the carrier device support base.

8. A wheeled carrier device, said device comprising:
    a substantially rigid support base structure substantially perpendicular to a rolling surface including a plurality of upwardly projecting stub walls, defining a side elevational profile and an outer perimeter; and at least one wheel support unit mounted to said support base; said wheel support unit including wheel attaching means and at least one wheel, and said wheel support unit being movable between a first, operative position wherein said wheel is erected to provide rolling support for said support base, and wherein the plane defined by said wheel support unit extends substantially orthogonally to the side elevational profile of the support base, and a second, stowed position, the plane defined by said wheel of said wheel support unit being swept through an angle during movement of said wheel support unit between said first and second positions such that the plane defined by said wheel in the second position of said wheel support unit is near to parallel and contiguous with the support base and substantially within the side elevational profile of said support base; and said wheel's periphery is substantially within the support base perimeter in said second, stowed position; and releasable latching means, for positively latching said at least one wheel support unit in both of said first and second positions thereof, and the at least one wheel support unit includes a latch and at least one arm structure which is further mounted to a pivot joint; and the joint is further mounted to the wheel support unit; and the joint and the latch in said first, operative position, retain the wheel of the wheel support unit in said first operative, position, substantially orthogonal to the carrier device support base; and in an intermediate position, the wheel support unit and the arm structure is released from the latch and both movable on the joint along a substantially vertical plane, and rotatable along an axis of rotation of the joint at least 90 degrees; and in the second, stowed position, the wheel is directed inward toward the center of the carrier device support base.

a selectively removable interconnection hitch element, which in a first, operative position serves as a hitch interconnecting the carrier device and a separate rolling device so that the separate rolling device propels the interconnected carrier device, and a push and pull handle secured to the carrier device, which is also slidably movable from a first extended, operative position, to a stowed, recessed position closely adjacent to the support base structure substantially within the outer perimeter of said device; said handle comprising at least two elongate portions at least partly contained within a handle receiving latitudinal cavity formed at least partly along the stub walls of the carrier device; at least one further opening is formed from said handle receiving latitudinal cavity on each of two opposing sides of said device, and handle latching means, movably mounted to the carrier device proximate to said handle receiving latitudinal cavity openings, which interact with a portion of said handle at said openings, and the at least two elongate handle portions are slidably movable through the handle cavity between the stowed and the operative handle positions, said movably mounted latching means are movable to an operative position wherein the latching means interact with and latch the handle at said opening along the stub wall handle cavity to prevent forward and rearward movement of said handle in relation to the carrier device, and unlatching of the movable latching means from said latched position permits movement of said handle between said operative and stowed handle positions.

9. A device in accordance with claim 8 wherein at least one movable underside support retains at least one wheel support unit in at least the second, stowed position.

10. A device in accordance with claim 8 wherein one of at least two of the wheeled carrier devices nests inside the base perimeter and at least partly within the side elevational profile of the other device, when both devices are in their second, stowed positions.

11. A device in accordance with claim 8 wherein a shaped portion at least near to the free upper edge of at least one stub wall serves as a hook receiving area to permit the carrier device to be hung by a hook on a vertical surface.

12. A wheeled carrier device, said device comprising:

a support base bottom defining a plane substantially perpendicular to a rolling surface including a plurality of upwardly projecting stub walls, defining a periphery, a side elevational profile and a perimeter, as well as an interior space and an underside aspect, and a selectively removable sub-assembly mounting frame includes at least one movably mounted wheel support unit component defined by at least one wheel and wheel attaching means and at least one movably mounted underside support component, and at least one movably mounted hand grasp serving as a handle, and a transport and storage position of the selectively removable sub-assembly mounting frame wherein the frame and the movably mounted components are located within the periphery, side elevational profile, perimeter as well as the interior space of the carrier device above the support base bottom, and in an underside aspect mounted position the selectively removable sub-assembly mounting frame is removably mounted to the underside aspect of the support base by at least one manually releasable connection, and the selectively removable sub-assembly mounting frame has at least two selective positions in said underside aspect mounted position, in a first operative underside aspect mounted position the at least one wheel support unit is erected providing rolling support for said carrier device and is orthogonal to the support base, the at least one underside support is erected orthogonally to the support base, providing support between the device and the rolling surface, and the at least one handle serves as a hand grasp, and in a second, stowed underside aspect mounted position, at least one wheel support unit and at least one wheel is substantially parallel with and contiguous to the underside aspect of the support base, and the periphery of the movably mounted components are substantially within the periphery, side elevational profile and perimeter of the carrier device support base.

13. A carrier device in accordance with claim 12, wherein the carrier device also includes a selectively removable interconnection hitch element, which in a first, operative position serves as a hitch interconnecting the carrier device and a separate rolling device so that the separate rolling device propels the interconnected carrier device.

14. A device in accordance with claim 12 wherein at least one movable underside support retains at least one wheel support unit in at least the second, stowed position.

15. A device in accordance with claim 12 wherein one of at least two of said devices nests inside the base perimeter and at least partly within the side elevational profile of the other device, when both devices are in their second, stowed positions.

16. A wheeled carrier device, said device comprising:

a support base substantially perpendicular to a rolling surface with an underside aspect forming four peripheral sides and a plane, and at least one movable wheel support unit, defining a wheel and wheel attaching means mounting the wheel to the underside aspect, and at least one handle comprising at least two substantially parallel movably extensible elongate arm portions and at least two corresponding elongate substantially parallel handle receiving portions mounted along opposing peripheral sides of the underside aspect of the support base, and at least one movable underside carrier device support mounted at least partly to the handle receiving portions which support defines a plane, and in a first operative position of the at least one wheel support unit, the wheel is orthogonal to the underside aspect of the base and the wheel provides rolling support to the carrier device, the at least one underside support is erected orthogonally to the underside aspect of the base providing support between the device and the rolling surface, the at least two extensible elongate movable arm portions of the handle are at least partly slidably extended away from the handle receiving portions, substantially outside the side elevational profile and periphery of the support base, and in a second, stowed position, the at least two movable elongate handle arm portions are contiguous to the elongate handle receiving portions, the at least one underside support is stowed substantially within the side elevational profile of the carrier device, the at least one stowed wheel of the wheel support unit is parallel and contiguous to the base underside aspect and is oriented substantially between the two handle receiving portions and also between the plane formed by the at least one stowed underside support and the underside aspect of the support base and at least one movable underside support retains at least one wheel of at least one wheel support unit in at least the second, stowed position.

17. A carrier device in accordance with claim 16, wherein the carrier device also includes a selectively removable interconnection hitch element, which in a first, operative position serves as a hitch interconnecting the carrier device and a separate rolling device so that the separate rolling device propels the interconnected carrier device.

18. A device in accordance with claim 16 wherein the at least one handle is a substantially u-shaped handle.

19. A wheeled carrier device, comprising:

at least a base portion substantially perpendicular to a rolling surface with an underside aspect defining a first periphery and a plane, an underside assembly movably mounted to the underside aspect, defining a second smaller periphery further having movably mounted thereto at least one wheel support unit including at least one wheel, at least one handle and at least one underside support which underside support defines a plane, and a pair of elongate, substantially parallel handle receiving portions, mounted along opposing peripheral sides of the underside aspect forming the side elevational profile of the underside assembly, in a first operative position of the underside assembly the at least one wheel is erected orthogonally to the device underside aspect providing rolling support to the device, the at least one underside support is erected providing support between the rolling surface and the device, and the at least one handle is moved to a position at least partly outside the said first and second peripheries, and in a second, stowed position of the underside assembly, the at least one handle is moved to a stowed position substantially within the side elevational profile of the underside assembly, the at least one wheel is moved to a position substantially parallel and contiguous to the underside aspect of the base, both between, and within the side elevational profile of, the handle receiving portions of the underside assembly and also between a plane formed by the at least one stowed underside support and the underside aspect of the device base, which underside support is moved to a stowed position within the side elevational profile and second periphery of the underside assembly and the at least one wheel support unit includes a latch and at least one arm structure which is further mounted to a pivot joint; and the joint is further mounted to the wheel support unit; and the joint and the latch in said first, operative position, retain the wheel of the wheel support unit in said first operative, position, substantially orthogonal to the carrier device support base; and in an intermediate position, the wheel support unit and the arm structure is released from the latch and both movable on the joint alone a substantially vertical plane, and rotatable along an axis of rotation of the joint at least 90 degrees; and in the second, stowed position, the wheel is directed inward toward the center of the carrier device base.

20. A carrier device in accordance with claim 19 wherein the carrier device also includes a selectively removable interconnection hitch element, which in a first, operative position serves as a hitch interconnecting the carrier device and a separate rolling device so that the separate rolling device propels the interconnected carrier device.

21. A device in accordance with claim 19 wherein at least one movable underside support retains at least one wheel support unit in at least the second, stowed position.

22. A device in accordance with claim 19 wherein one of at least two of said devices nests inside the base portion and at least partly within the side elevational profile of the other device, when both devices are in their second, stowed positions.

* * * * *